UNITED STATES PATENT OFFICE.

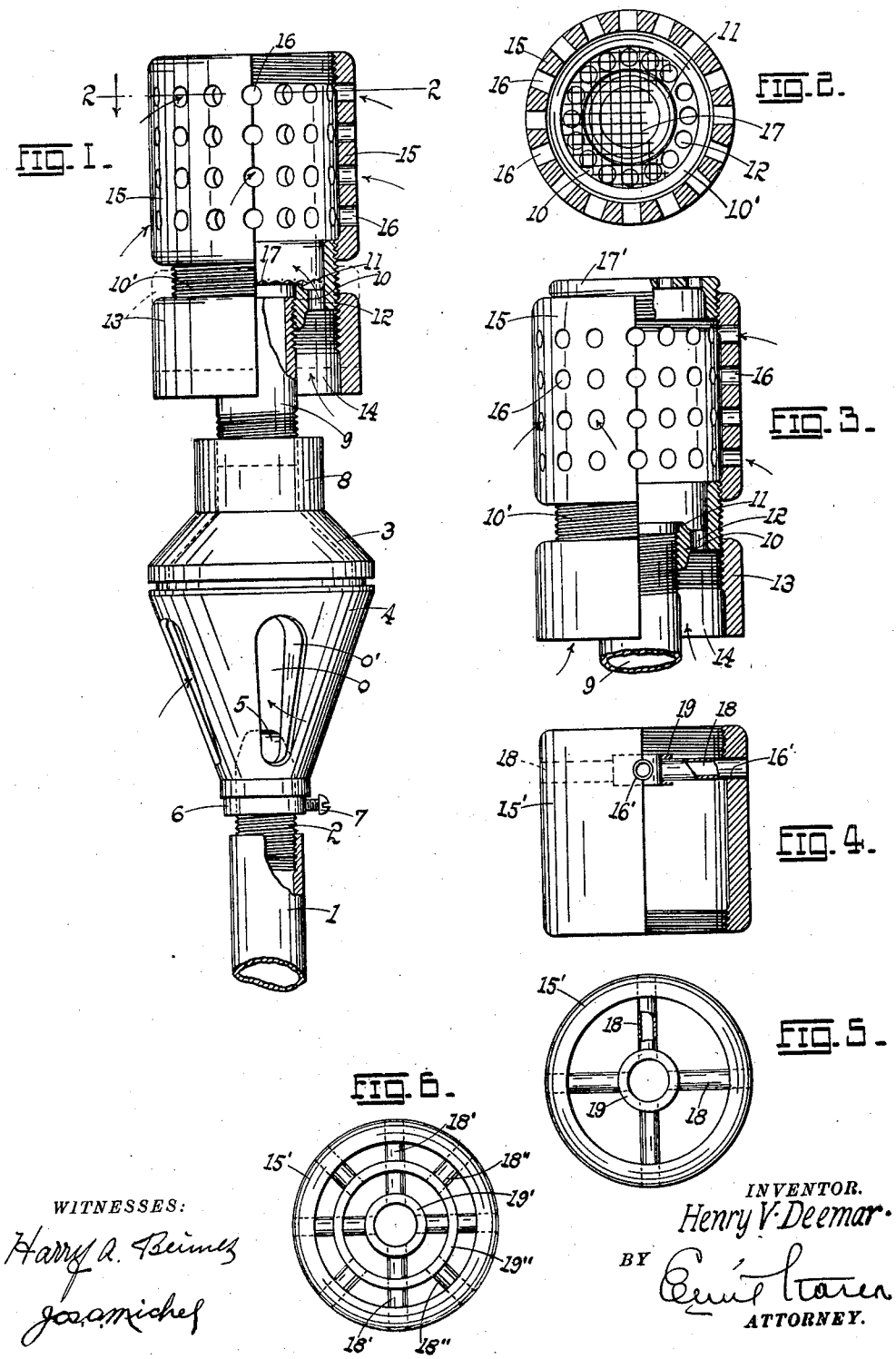

HENRY V. DEEMAR, OF ST. LOUIS, MISSOURI.

GAS-BURNER.

1,047,392.

Specification of Letters Patent. Patented Dec. 17, 1912.

Application filed March 4, 1912. Serial No. 681,352.

*To all whom it may concern:*

Be it known that I, HENRY V. DEEMAR, citizen of the United States, residing at St. Louis, State of Missouri, have invented certain new and useful Improvements in Gas-Burners, of which the following is a full, clear, and exact description, reference being had to the accompanying drawings, forming a part hereof.

My invention has relation to improvements in gas-burners; and it consists in the novel details of construction more fully set forth in the specification and pointed out in the claims.

In the drawings, Figure 1 is an elevation and a half section of the upper portion of the burner; Fig. 2 is a cross-section on the line 2—2 of Fig. 1; Fig. 3 is a half elevation and half section of a modified form of burner member; Fig. 4 is a half-section and half-elevation of a still further modification; Fig. 5 is a top plan of Fig. 4, with parts broken away; and Fig. 6 is a top plan of a modified form on the order of Figs. 4 and 5.

The object of my invention is to construct a gas or vapor burner which may be used for any industrial, commercial or domestic purpose; one which shall deliver a long and pronounced flame without resort to pressure above that of the atmosphere to supply the necessary head for the projection of the flame beyond the end of the burner; one which will develop a flame of great heat intensity; one in which the back flash is practically eliminated; one which can be made at little cost, comprising a minimum number of parts; one readily applied to a stove, furnace heater or apparatus of any description; and one possessing further and other advantages better apparent from a detailed description of the invention which is as follows.

Referring to the drawings, and for the present to Figs. 1 to 3 inclusive, 1 represents the terminal of a gas pipe leading from any suitable source of supply (not shown), to which pipe is screwed the terminal threaded stem 2 of a (preferably) double truncated conical mixing chamber 3, the larger truncated cone being provided with air openings $o$ controlled by corresponding openings $o'$ of the rotatable shell or damper 4, said air openings being disposed about the nipple 5 which discharges the gas into the chamber substantially along the axis of said chamber. In the particulars referred to, the parts are in all essential particulars on the order of the well known Bunsen burner, except that in the present instance a large and spacious mixing chamber is provided, the doubly converging walls whereof serve to insure a thorough mixture between the air and gas. The rotatable damper or valve 4 is held in position by a collar 6 passed over the screw-stem 2 and held thereon by a binding screw 7. To a socket or neck 8 forming the discharge end of the mixing chamber is screwed one end of a pipe 9, the opposite end being screwed to a flanged disk 10 about the central opening of which on the discharge side of the disk is disposed an annular or equivalent ledge 11, between which and the outer edge or periphery of the disk are series of air-intake ports 12 preferably circular as shown (though they may be of any desired shape). Secured about the periphery of the disk and directed toward the mixing chamber is a ring 13 which forms an annular apron about the ports 12, causing the air induced into the ports 12 to flow past the free edge of the apron and be directed in paths substantially parallel to the axis of the apron as the air flows through the space or chamber 14 formed between the pipe 9 and the apron. The disk 10 forms the perforated bottom of the burner-head 15, the latter being provided with peripheral air-intake openings 16 and being screwed to the outside of the disk 10. The parts 10 and 15 may however, be made in one piece if so desired. Resting on the annular ledge 11 is a retarding reticulated disk or grid 17 preferably of coarse mesh wire, the same forming a diaphragm against possible back-flash of the flame issuing from the burner, yet at the same time permitting a free and uninterrupted passage therethrough of the air entering the burner through the ports or openings 12. The ledge 11 spaces the wire gauze member 17 a slight distance from the inner face of the disk 10. The length of the flame issuing from the mouth of the burner depends in a measure on the degree of separation between the apron 13 and burner-head 15, the depth of the peripheral screw-threaded flange 10' of the disk being such as to permit a greater or less degree of separation between the adjacent ends of the said members 13 and 15, as obvious from the drawings, and as shown by the dotted showing in Fig. 1. The disk 10 need not of course be cup-shaped, so long as it is sufficiently thick to allow for a reasonable adjustment of the distances between the parts 13 and 15. The greater the separation between them the longer will be flame and vice-versa, the reason being that the deeper the apron (that is the farther it projects toward the mixing chamber form the disk 10) the more intense and direct is the air induction through the ports 12 and hence the farther will the flame be projected. The projection of the flame therefore, beyond the mouth of the burner is accomplished by mere atmospheric influx of air into and through the ports 12 at normal atmospheric pressure and without the use of any artificial pressure. This constitutes one of the features of the present invention.

It will be seen that the gas is supplied with a maximum quantity of air. First is the air complement which enters the mixing chamber through the openings o', o; then the currents admitted through the ports 12 into the burner chamber 15; then the currents admitted through the openings 16. The result of it all is complete combustion and a hot flame.

In lieu of the diaphragm 17, I may substitute a perforated cap-piece 17' closing the discharge end of the burner in which event the diaphragm 17 is omitted. This modification is shown in Fig. 3.

For a very hot flame, I improvise a burner member 15' with intake ports 16' conducting air into the hollow radial arms or tubes 18 of a spider composed of said arms and a single central ring 19, the air being conducted to the center of the ring where all the oxygen is thus concentrated. This produces a very intense flame. Such a modification is illustrated in Figs. 4 and 5. In other instances I may provide two rings 19', 19'', with radial tubes 18', 18'', as shown in the modification in Fig. 6.

Having described my invention, what I claim is:—

1. In combination with a mixing chamber having a gas intake and an air intake, a burner-head positioned to receive the gases from the chamber, the base of the burner-head being provided with air-intake openings surrounding the intake thereto from the mixing chamber, and an apron surrounding said air-intake openings and adjustable relatively to and from the burner-head for guiding the air-currents to said openings and regulating the length of flame projected from the burner-head.

2. In combination with a mixing chamber having a gas intake and air intake openings, a burner-head at the discharge end of the mixing chamber, the bottom of the burner-head being provided with air intake openings disposed about the intake thereto from the mixing chamber, a perforated diaphragm positioned in the burner-head beyond the air intake openings aforesaid, and serving as a grid against back-flashing of the flame, and an apron surrounding the air intake openings of the burner-head.

3. In combination with a mixing chamber having a gas intake and air intake openings, a pipe secured at the discharge end of the chamber, a burner-head secured to said pipe and having openings in its bottom disposed about the pipe, a ledge disposed on the inner face of the burner-head bottom between said openings and the discharge from said pipe, a reticulated diaphragm resting on said ledge and spaced from the burner-head bottom, the peripheral walls of the burner-head being provided with air-intake openings, and an apron surrounding the bottom openings of the burner-head and projecting toward the mixing chamber and adjustable relatively to and from the burner-head, substantially as set forth.

4. In combination with a mixing chamber having a gas intake and air intake openings, a burner-head at the discharge end of the mixing chamber, the bottom of the burner-head being provided with air-intake openings surrounding the intake to the burner-head from the mixing chamber, and an apron surrounding said air intake-openings for guiding the air-currents to said openings and determining the length of the flame projected from the burner-head.

In testimony whereof I affix my signature, in presence of two witnesses.

HENRY V. DEEMAR.

Witnesses:
EMIL STAREK,
JOS. A. MICHEL.

---

Copies of this patent may be obtained for five cents each, by addressing the "Commissioner of Patents, Washington, D. C."